Figure 1:
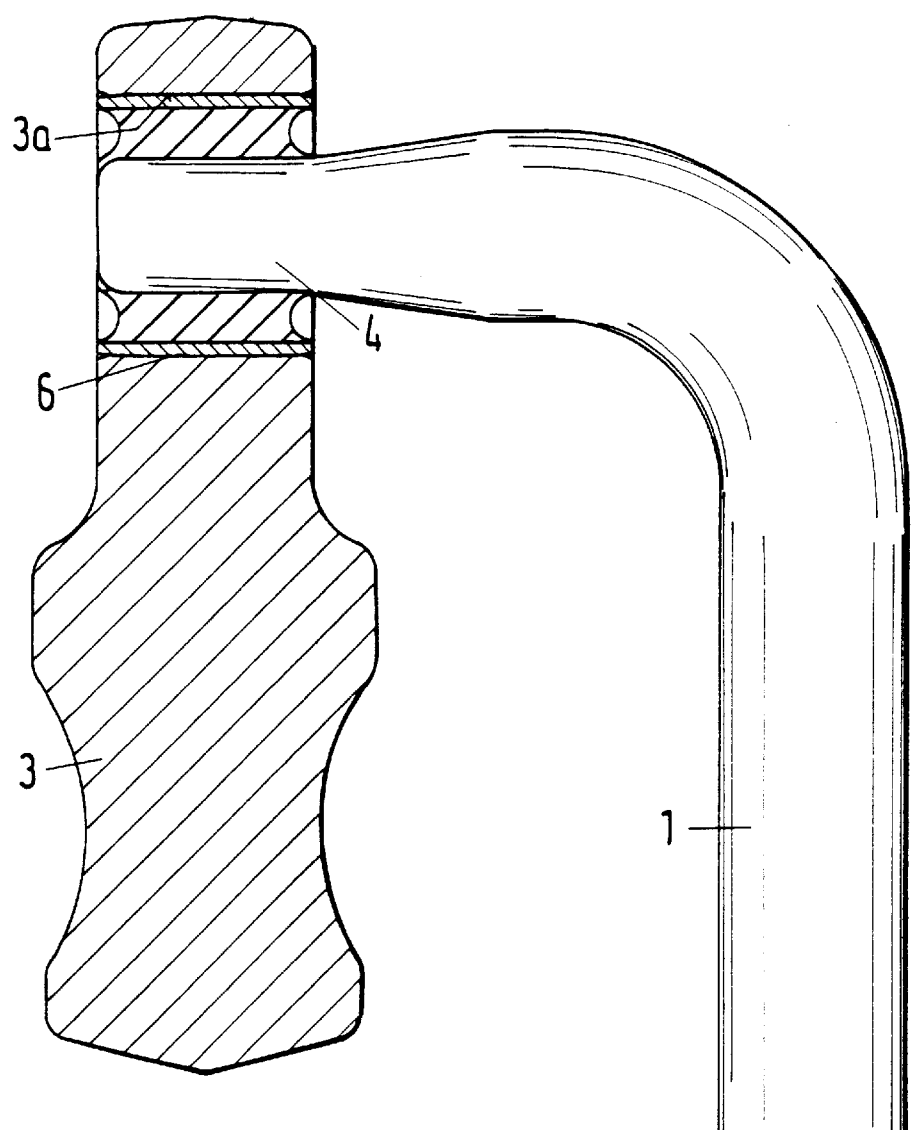
Figure 1:
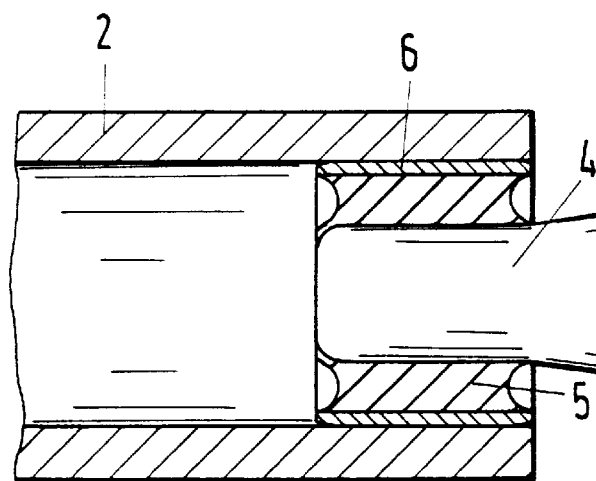

United States Patent
Kraps

[11] Patent Number: 5,876,148
[45] Date of Patent: *Mar. 2, 1999

[54] CONNECTION OF AN ANTIROLL BAR TO A WHEEL SUSPENSION OF A MOTOR VEHICLE

[75] Inventor: Jakob Kraps, Dormagen, Germany

[73] Assignee: TRW Fahrwerksysteme GmbH & Co. KG, Dusseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 754,024

[22] Filed: Nov. 20, 1996

[30] Foreign Application Priority Data

Nov. 23, 1995 [DE] Germany .......... 195 43 690.3

[51] Int. Cl.⁶ ................................ F16C 11/00
[52] U.S. Cl. .............. 403/119; 403/56; 403/122; 280/689; 280/674; 280/716
[58] Field of Search .............. 403/56, 119, 122, 403/138, 135, 129, 144, 226, 225, 224; 280/689, 673, 674, 716

[56] References Cited

U.S. PATENT DOCUMENTS

| | | | |
|---|---|---|---|
| 1,660,148 | 2/1928 | Andres | 403/56 X |
| 2,103,729 | 12/1937 | Leighton | 403/225 X |
| 2,246,833 | 1/1941 | Beemer | 403/225 X |
| 2,254,325 | 9/1941 | Slack et al. . | |
| 2,300,237 | 10/1942 | Schroeter et al. . | |
| 2,521,335 | 9/1950 | Booth | 280/674 |
| 2,660,908 | 12/1953 | French et al. | 403/224 X |
| 3,026,124 | 3/1962 | Eyb | 403/225 X |
| 3,166,333 | 1/1965 | Henley | 280/674 X |
| 3,218,053 | 11/1965 | Shreve | 280/689 X |
| 3,275,313 | 9/1966 | Hoenick . | |
| 3,740,986 | 6/1973 | Schmid . | |
| 4,854,766 | 8/1989 | Hein | 280/689 X |
| 4,954,006 | 9/1990 | Suzuki et al. | 403/135 |
| 5,062,656 | 11/1991 | Hynds et al. . | |

FOREIGN PATENT DOCUMENTS

| | | | |
|---|---|---|---|
| 246581 | 4/1966 | Austria | 280/674 |
| 628390 | 10/1961 | Canada | 280/689 |
| 1105525 | 12/1955 | France . | |
| 1373934 | 1/1965 | France . | |
| 3737735 | 6/1988 | Germany . | |
| 4331976 | 3/1995 | Germany . | |
| 551397 | 11/1956 | Italy | 280/674 |
| 1182109 | 7/1989 | Japan . | |
| 3092419 | 4/1991 | Japan . | |
| 2006319 | 5/1979 | United Kingdom . | |
| 2220625 | 1/1990 | United Kingdom . | |

OTHER PUBLICATIONS

Kunstoffe Bd. 82, Nr. 3, Mar. 1, 1992.
Article entitled "ATZ Automobiltechnische Zeitschrift 96 (1994) 9".

*Primary Examiner*—Kenneth J. Dorner
*Assistant Examiner*—William L. Miller
*Attorney, Agent, or Firm*—Tarolli, Sundheim, Covell, Tummino & Szabo

[57] ABSTRACT

An apparatus for use in a vehicle includes an antiroll bar (2) having a first opening, a vehicle part (3) having a second opening (3a), and a one-piece connecting rod (1) connecting the antiroll bar and the vehicle part. The one-piece connecting rod (1) has a first end portion (4) received in the first opening in the antiroll bar (2) and a second end portion (4) received in the second opening (3a) in the vehicle part (3). A first bearing (5) in the first opening supports the first end portion (4) of the one-piece connecting rod (1) for movement relative to the antiroll bar (2). A second bearing in the second opening (3a) supports the second end portion (4) of the one-piece connecting rod (1) for movement relative to the vehicle part (3).

4 Claims, 2 Drawing Sheets

CONNECTION OF AN ANTIROLL BAR TO A WHEEL SUSPENSION OF A MOTOR VEHICLE

BACKGROUND OF THE INVENTION

The invention pertains to a connection of one end of an antiroll bar to a part, preferably a control arm of a wheel suspension of a motor vehicle, by means of a connecting rod which is connected both to the antiroll bar and to the wheel suspension by means of a joint.

It is conventional to connect the end of an antiroll bar, by means of a connecting rod, to a part of a wheel suspension of a motor vehicle, preferably to a control arm, with this connection being carried out by means of a respective joint. The angled ends of a conventional U-shaped connecting rod are provided with cross holes, in each of which is arranged a bearing shell. These bearing shells serve to accept a bearing journal which is arranged either at the end of an antiroll bar or at the end of a control arm. For the known construction, an antiroll bar flattened at the end is also provided with a cross hole which serves to accept a bearing journal. A corresponding cross hole for accepting a second bearing journal of the connection is developed in the control arm.

This known connection between an antiroll bar and a part of a wheel suspension of a motor vehicle has the disadvantage that not only must the connecting rod and control arm be expensively machined in order to accept a bearing shell or bearing journal, but also that a preparation of the antiroll bar is required which is made costly by the machining for flattening and metal cutting.

Therefore, the underlying purpose of the invention is to improve the connection, carried out by means of a connecting rod, of an antiroll bar to a part of a wheel suspension with the aim of reducing the machining processes, thus reducing cost.

The solution by means of the invention to this problem is characterized by the fact that each end of a connecting rod is provided with a bearing journal running in an axial direction, which is supported, by means of a bearing shell, in a receiver opening of the wheel suspension or in the tubular end of the antiroll bar.

The improvement, in accordance with the invention, of the known connection obviates the necessity of a costly machining of the end of an antiroll bar which accepts the bearing journal of a connecting rod, since the bearing shell belonging to this bearing journal, due to the arrangement of the bearing journal in an axial extension of the respective end of the connecting rod, can simply be inserted directly in the end of a tubular antiroll bar. It is only required to cut the tubular antiroll bar precisely to the required final dimension. Since the other bearing journal of the connecting rod is supported by means of a bearing shell in a receiver opening of the wheel suspension, in particular, of a control arm, which already must be provided, due to the fact that it is suspended, with at least one additional receiver opening, the machining processes of a control arm or of the part of a wheel suspension connected to an antiroll bar are decreased and simplified. This part can be machined in a chuck with a reduced number of cutting processes such that a reduction of work and cost also results in this respect. In addition, various fastening parts are no longer needed with the improvement in accordance with the invention, since the bearing journals are formed directly on the connecting rod. Above and beyond this, the alignment of the bearing journals to a connecting rod and of the bearing shells to the antiroll bar or control arm which is more favorable in comparison to the known state of the art allows the volume of the individual parts to be decreased and consequently produces a weight savings. Finally, the improvement in accordance with the invention results in a more limited assembly cost, achieving, all in all, a substantial cost savings.

In accordance with an additional feature of the invention, the bearing journals can be in the form of ball pivots, which preferably are formed as a single piece with the connecting rod.

In order to facilitate arranging a sealing boot for a respective steering joint, a flute can be formed, in accordance with an additional feature of the invention, in the transitional area between the connecting rod and the ball pivot, as a seating for an edge reinforcement of a sealing boot. In addition, it is possible to develop a bearing shell having a receiver groove for the other edge reinforcement of a sealing boot.

Two embodiments of a connection in accordance with the invention are represented in the figure. Shown are:

FIG. 1: A first embodiment with the aid of a top view of a connecting rod, the ends of which are supported, by means of a cylindrical bearing journal, in an antiroll bar or in a control arm and FIG. 2: A representation, in accordance with FIG. 1, of a second embodiment having ball pivots formed on the ends of a connecting rod.

For both embodiments, a connecting rod (1) serves as a connection between a tubular antiroll bar (2) and a part of a wheel suspension of a motor vehicle, which is represented as a control arm (3). The end of the antiroll bar (2) recognizable in the figure is represented in section, as is the control arm (3), in the plane of the connecting rod (1). A control arm (3), preferably forged, is provided with at least one bearing opening for its suspension and, if required, an additional bearing opening for attaching a shock absorber, which, however, is not recognizable in the drawing due to the plane of the section chosen here. At least the ends of the antiroll bar (2) have a tubular configuration, as is seen in FIGS. 1 and 2.

For both embodiments, each end of the connecting rod (1) is provided with a bearing journal having a path in the axial direction of the respective end. While one of the bearing journals is supported in the tubular end of an antiroll bar (2), the other bearing journal is supported in a receiver opening (3a) of the control arm (3). The two embodiments differ with respect to the development of the bearing journals and associated bearing shells.

For the first embodiment, in accordance with FIG. 1, a connecting rod (1) is provided with cylindrical bearing journals (4) on which is arranged an annular bearing element (5) of permanently elastic material. By means of a cylindrical bushing (6) which serves as a bearing shell, the bearing element (5) is supported either in the tubular end of the antiroll bar (2) or in the receiver opening (3a) of the control arm (3). Because of the elasticity of the bearing element (5), limited relative movement is possible between a respective bearing journal (4) and the antiroll bar (2) or control arm (3).

Figure 2:
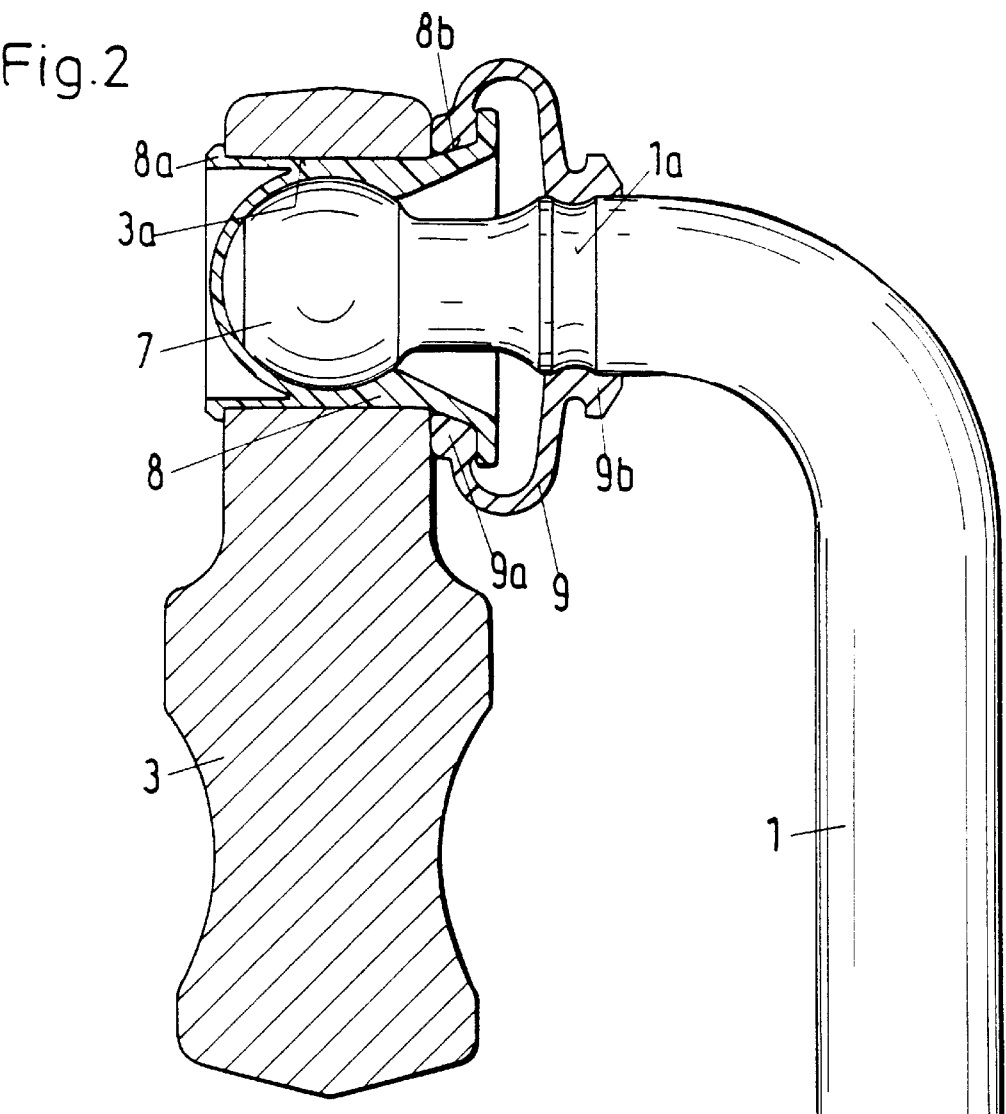
Figure 2:
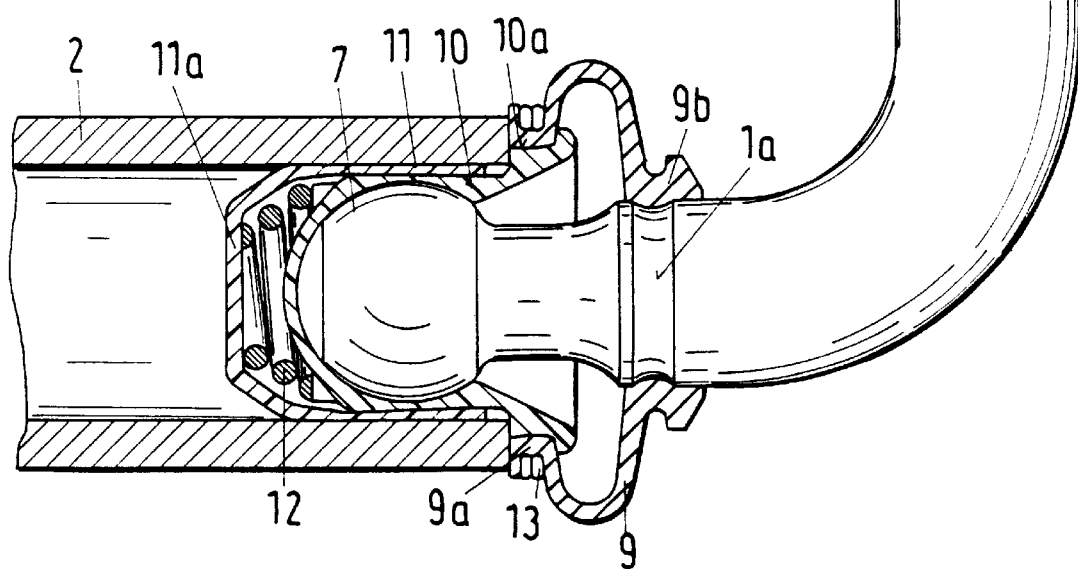

For the second embodiment in accordance with FIG. 2, ball pivots (7) which, in each case, are supported by means of a bearing shell in the tubular end of the antiroll bar (2), or in the bearing opening (3a) of the control arm (3), are formed at the end of the connecting rod (1). The two bearing shells shown in FIG. 2 are executed differently.

For the embodiment supporting a ball pivot (7) in a control arm (3), there is a one-piece bearing shell (8) which is introduced from the side into the receiver opening (3a) of the control arm (3) and fixed in the receiver opening (3a) with the aid of hooks (8a) which can be deformed elastically and which are supported against the other side of the control arm (3). In this connection, the bearing shell (8) forms a receiver groove (8b) for an edge reinforcement (9a) of a sealing boot (9), the other edge reinforcement (9b) of which is fixed in a seat in the form of a flute (1a) which is formed in the transitional area between the connecting rod (1) and ball pivot (7). A sealing boot (9) arranged in this way between a connecting rod (1) and control arm (3) prevents the penetration of dirt and impurities into the steering joint, which is preferably packed with grease.

A bearing shell (10) accepting a ball pivot (7) in the tubular end of the antiroll bar (2) is constructed with a conical surface area, tapering in the direction of the connecting rod (1) and having a locking ring (11) provided with a correspondingly conical opposite surface. This locking ring (11) is supported by its cylindrical surface area in the tubular end of the antiroll bar (2) and is provided with a base (11a). A conical wire spring (12) is arranged between this base (11a) and the bearing shell (10). This conical wire spring (12) creates a force which, by means of the conical surfaces, brings about a fixing of a bearing shell (10) with the aid of the locking ring (11) in the tubular end of the antiroll bar (2).

For this embodiment of a bearing shell (10) as well, it is provided with a receiver groove (10a) for an edge reinforcement (9a) of a sealing boot (9). The other edge reinforcement (9b) of a sealing boot (9) is fixed, in turn, in a flute (1a) of a connecting rod (1). For the embodiment, an additional retention of the sealing boot (9), in the area of its edge reinforcement (9a), within the bearing shell (10) is brought about by means of a retaining ring (13).

Both embodiments reveal that no machining of the tubular end of the antiroll bar (2) is required in order to support a bearing journal (4) in this end by means of an annular bearing element (5) and a bushing (6) or a ball pivot (7) by means of a bearing shell (10). Also, the machining of the control arm (3) for supporting the bearing journal (4) or ball pivot (7) is reduced to the formation of a cylindrical receiver opening (3a).

LIST OF REFERENCE NUMBERS

1 Connecting rod
1a Flute
2 Antiroll bar
3 Control arm
3a Receiver opening
4 Cylindrical bearing journal
5 Annular bearing element
6 Bushing
7 Ball pivot
8 Bearing shell
8a Hook
8b Receiver groove
9 Sealing boot
9a Edge reinforcement
9b Edge reinforcement
10 Bearing shell
10a Receiver groove
11 Locking ring
11a Base
12 Conical wire spring
13 Retaining ring Having described the invention, the following is claimed:

1. Apparatus for use in a vehicle, said apparatus comprising:

an antiroll bar having a first opening therein centered on a first axis;

a control arm having a second opening therein, said second opening being centered on a second axis which lies parallel to said first axis;

a one-piece connecting rod connecting said antiroll bar and said control arm, said one-piece connecting rod having a U-shape defined by a central portion and first and second end portions, said first and second end portions extending perpendicularly from said central portion and in the same direction from said central portion, said first end portion being received in said first opening in said antiroll bar and said second end portion being received in said second opening in said control arm;

a first bearing in said first opening supporting said first end portion of said one-piece connecting rod for movement relative to said antiroll bar; and a second bearing in said second opening supporting said second end portion of said one-piece connecting rod for movement relative to said control arm, said first and second end portions of said one-piece connecting rod comprising first and second ball pivots formed integrally with said one-piece connecting rod.

2. The apparatus of claim 1 wherein said first and second bearings comprise first and second bearing shells, said first and second bearing shells receiving said first and second ball pivots and supporting said ball pivots for relative movement.

3. The apparatus of claim 2 wherein said one-piece connecting rod includes a flute formed in a transitional area adjacent at least one of said first and second ball pivots, said flute for receiving one end of a sealing boot.

4. The apparatus of claim 3 wherein at least one of said first and second bearing shells includes an annular groove for receiving another end of the sealing boot.

\* \* \* \* \*